3,547,865
POLYMER RECOVERY PROCESS

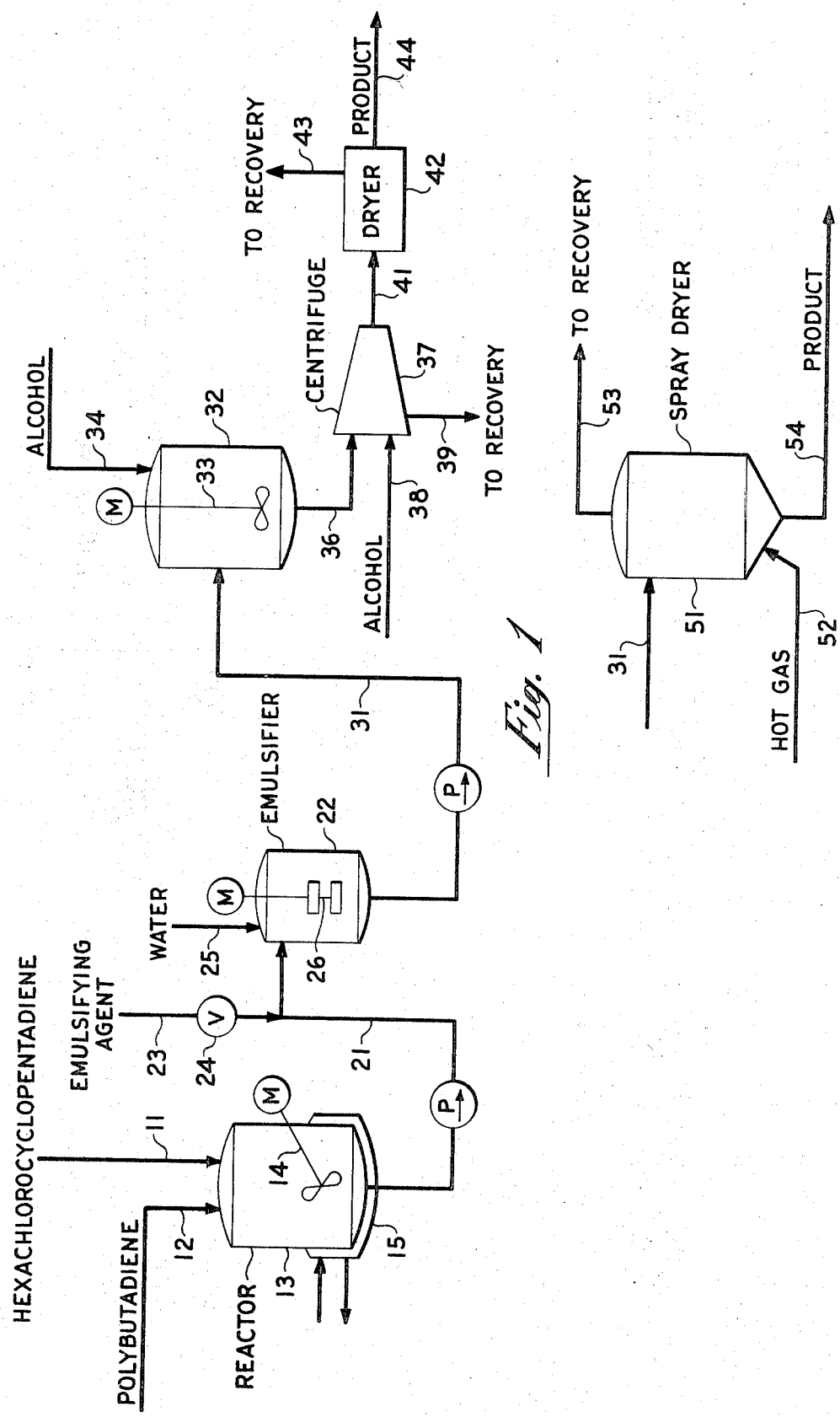

Paul E. Hoch, Moraga, Calif., and George B. Stratton, Lewiston, N.Y., assignors to Hooker Chemical Corporation, Niagara Falls, N.Y., a corporation of New York
Continuation-in-part of application Ser. No. 509,969, Nov. 26, 1965, which is a continuation-in-part of application Ser. No. 489,893, Sept. 24, 1965, which in turn is a continuation-in-part of application Ser. No. 293,157, July 5, 1963, which also in turn is a continuation-in-part of application Ser. No. 216,293, Aug. 13, 1962. This application Apr. 29, 1969, Ser. No. 826,766
Int. Cl. C08d 5/00; C08f 1/92, 1/96
U.S. Cl. 260—94.7        10 Claims

ABSTRACT OF THE DISCLOSURE

A polymer of polybutadiene and a polyhalogenated cyclopentadiene is recovered from a reaction mixture containing same by emulsifying the reaction product with an aqueous emulsifying medium and an emulsifying agent, contacting the resulting emulsion with a solvent such as an alcohol in which the polymer is substantially insoluble to produce an aqueous phase and a polymer phase, and thereafter recovering the polymer product.

CROSS REFERENCES TO PRIOR APPLICATIONS

This is a continuation-in-part of application S.N. 509,-969, filed Nov. 26, 1965, now abandoned, which is a continuation-in-part of aplications S.N. 489,893, filed Sept. 24, 1965, now U.S. Pat. 3,442,884, and S.N. 293,157, filed July 5, 1963, now abandoned, which is a continuation-in-part of application S.N. 216,293, filed Aug. 13, 1962, now U.S. Pat. 3,268,475.

This invention relates to the recovery of polymers from solution. In another aspect, the invention relates to the purification of polymers to remove extraneous materials therefrom. More particularly, the invention relates to the recovery and purification of polymers formed by the reaction of a polyhalogenated cyclopentadiene with a butadiene polymer.

Highly useful halogen-containing polymeric materials are produced by reacting a polymer of butadiene with polyhalogenated cyclopentadienes having the formula:

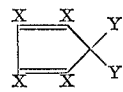

wherein X is selected from the group consisting of fluorine, chlorine and bromine, and Y is selected from the group consisting of fluorine, chlorine, bromine and an alkoxy radical. Generally, the alkoxy radicals have 1 or 2 carbon atoms, but higher carbon chain links, for example, up to 4 carbon atoms, can be employed. Typical polyhalogenated cyclopentadienes are hexachlorocyclopentadiene, hexabromocyclopentadiene, 1,1-dibromotetrachlorocyclopentadiene, 1,1-difluorotetrachlorocyclopentadiene, 1,1-dimethoxytetrachlorocyclopentadiene, 1,1-diethoxytetrachlorocyclopentadiene, and the like. Polymers of butadiene that can be reacted or adducted with the polyhalogenated cyclopentadienes are the various ethylenically unsaturated polybutadienes prepared by mass, solution or emulsion polymerization techniques, butadiene-styrene copolymers made by emulsion and solution methods, butadiene-styrene block copolymers, butadiene-acrylonitrile copolymers, and the like. Particularly useful are the polybutadienes which contain at least 30 percent of the cis 1,4-configuration, and preferably at least 80 percent of the cis 1,4-configuration, and still more preferably at least 90 percent of the cis 1,4-configuration.

In the process for adducting the halogenated cyclopentadiene to a butadiene polymer by the Diels-Alder reaction, it is preferred to utilize in the reaction mixture at least about 5 parts of polyhalogenated cyclopentadiene per part of butadiene polymer. However, lower ratios, such as 3 or 4 parts of halogenated cyclopentadiene can be used per part of butadiene polymer, but longer reaction times are then desirable. Much larger quantities of halogenated cyclopentadiene can be utilized, e.g., up to 100 parts of halogenated cyclopentadiene per part of butadiene polymer and higher. In fact, it is convenient to use the halogenated cyclopentadiene as the diluent in the reaction mixture. However, other diluents that are not deleterious to the reaction can be used, for example, the aromatic hydrocarbons, such as benzene, toluene, xylene, and the like; chlorinated hydrocarbons, such as trichloroethylene, tetrachloroethane, the chlorobenzenes, the chlorotoluenes, and the like; esters, such as isobutyl acetate, ethyl butyrate, and the like. The ratio of solvent used in the reaction mixture generally does not exceed about 100 parts per part of butadiene polymer reacted. The reaction proceeds best at elevated temperatures, generally in the range of 70 to 200 degrees centigrade, preferably in the range of 100 to 170 degrees centigrade. It is generally convenient to conduct the reaction at atmospheric pressure, although, depending on the use of particular diluents and reaction temperatures, it is sometimes convenient to carry out the reaction at superatmospheric pressure or under vacuum. During the course of the reaction, some halogen halide may be produced. The color of the resulting product can be improved by absorbing the hydrogen halide by including a scavenger, such as an epihalohydrin or other epoxide, in the reaction zone. It is sometimes desirable to include other additives in the reaction mixture to control the molecular weight of the polymer product.

In most product applications, it is desirable to utilize the halogenated polymer of the invention in a form that is substantially free of unreacted halogenated cyclopentadiene. However, because of the relatively high boiling points of the halogenated cyclopentadienes, it is somewhat difficult to remove the unreacted polyhalogenated cyclopentadiene from the reaction product.

Accordingly, an object of the invention is to provide an improved process for the recovery of the adduct of a butadiene polymer and a polyhalogenated cyclopentadiene from the reaction mixture from which the polymer is produced. Another object of the invention is to provide a process for the production of an adduct of a butadiene polymer and a polyhalogenated cyclopentadiene that is substantially free of unreacted polyhalogenated cyclopentadiene. A further object of the invention is to provide a polyhalogenated polymer product that has a low, residual polyhalogenated cyclopentadiene content, and which has a relatively high bulk density. These and other objects and advantages of the invention will be apparent to one skilled in the art upon reading the following detailed specification and the accompanying drawing.

In accordance with this invention, there is provided a process which comprises effecting the separation of an aqueous emulsion of polymer into an aqueous phase and a polymer phase, and thereafter recovering a solid polymer product. In one embodiment, the process of the invention comprises effecting the separation of the aqueous emulsion by contacting the emulsion with a solvent or diluent in which the polymer is substantially insoluble. This contacting step results in precipitation of a solid polymer phase from the emulsion. The solid polymer product can be recovered by separating it from the aqueous phase by a suitable method, such as centrifugation or filtration, and thereafter drying the product. If desired, the polymer product can be further purified by contacting the polymer phase with additional solvent or diluent to further remove the unreacted polyhalogenated cyclopentadiene therefrom. In another embodiment of the invention, the separation of the emulsion is effected by contacting the emulsion with hot gases, such as in a spray dryer, to evaporate a portion of the unreacted polyhalogenated cyclopentadiene and to form solid polymer particles. Thereafter, the polymer product can be further purified by contacting the solid polymer with a solvent or diluent to further remove unreacted polyhalogenated cyclopentadiene therefrom. The final polymeric product is generally in solid form, i.e., free-flowing particles, such as powder, granules, flakes, or other comminuted or particulate form. The polymer is in the normally solid state at 30 degrees centigrade. By purifying the polymer in the aforesaid manner, it is possible to produce polymer products having lower levels of residual unreacted polyhalogenated cyclopentadiene than has been heretofore possible in this art.

Further, in accordance with this invention, there is provided as a new composition of matter an aqueous emulsion of polymer produced by the process disclosed herein which is comprised of (a) a polymer of a butadiene polymer and a polyhalogenated cyclopentadiene (b) polyhalogenated cyclopentadiene, (c) an aqueous emulsifying medium and (d) an emulsifying agent. Also in accordance with this invention, there is provided as a new composition of matter an aqueous emulsion of polymer produced which comprises (a) a polymer of a butadiene polymer and a polyhalogenated cyclopentadiene, (b) an aqueous emulsifying medium, and (c) an emulsifying agent. The three component emulsion is produced by heating the aforesaid four component emulsion to an elevated temperature to evaporate the unreacted polyhalogenated cyclopentadiene. Such aqueous emulsions are useful in the application of coatings of the disclosed polymers to surfaces, such as wood, metal and the like, to provide protective coatings for such surfaces.

While this invention is described particularly with respect to the polymers of polybutadiene and a polyhalogenated cyclopentadiene, it is also applicable to recovery from polymers from solutions broadly, i.e., polymers prepared by other processes can be recovered by the method of this invention. For example, polycarbonates, prepared by the interfacial polymerization technique, may be isolated by the precipitation process disclosed herein.

The invention will be further described by reference to the accompanying drawing which is a flow sheet for preferred embodiments of the process of the invention.

Referring to FIG. 1, a polyhalogenated cyclopentadiene, such as hexachlorocyclopentadiene, and a butadiene polymer such as polybutadiene, are introduced through conduits 11 and 12, respectively, into reactor 13. The reaction zone can comprise a single reactor operated either batchwise or continuously, or a group of reactors operated either batchwise or continuously in series and/or in parallel, Reactor 13 is provided with suitable agitation means such as agitator 14, and suitable heating means such s heating jacket 15. After a suitable reaction cycle in accordance with the disclosure given herein, the reaction mixture is transferred through conduit 21 to emulsifier 22. A suitable emulsifying agent is transferred through conduit 23 and control valve 24 to the reaction mixture in conduit 21. Alternatively, the emulsifying agent can be injected directly into the emulsifier 22. Water is introduced to emulsifier 22 through conduit 25. The components are subjected to vigorous agitation by a suitable agitator 26 and the resulting emulsion is transferred through conduit 31 to zone 32. Zone 32 can comprise an enclosed vessel equipped with suitable agitation means, such as agitator 33. Zone 32 is supplied with a suitable amount of alcoholic medium through conduit 34, and the resulting alcoholic slurry of precipitated polymer particles is transferred through conduit 36 to centrifuge 37. In the centrifuge 37, the bulk of the water and alcohol together with hexachlorocyclopentadiene removed from the polymer particles is separated from the precipitated polymer phase and discharged through conduit 39 to suitable recovery facilities (not shown). The water, alcohol and hexachlorocyclopentadiene can be readily separated, such as by distillation, for recycle to conduits 34 and 11, respectively. An alcohol wash stream can be introduced, if desired, to centrifuge 37 through conduit 38. The solid polymer is discharged from centrifuge 37 through conduit 41 to dryer 42. Residual volatile matter, such as alcohol, hexachlorocyclopentadiene, water and other volatile compounds are discharged from the dryer 42 through conduit 43. The dry polymer product is recovered from the dryer through conduit 44.

Referring to FIG. 2, an emulsion, such as produced in emulsifier 22, described with respect to FIG. 1, is transferred through conduit 31 to spray dryer 51, preferably at or near the top portion thereof. The spraying drying zone can comprise a vertically disposed, elongated cylindrical vessel which tapers to a conical section at the bottom to facilitate collection of the dried product. However, other configurations can be employed, if desired. Hot gases are introduced near the bottom of the spray dryer 51 through conduit 52. After contacting the downwardly flowing material in the spray dryer 51, the hot gases and vapors of water, alcohol, hexachlorocyclopentadiene and other volatiles pass out of spray dryer 51, at or near the top portion thereof through conduit 53 to suitable recovery facilities (not shown). The dried polymer product is removed from the spray dryer 51 through conduit 54. Removal of the dried product can be facilitated by using an auger, conveyor belt or other suitable means. However, gravity flow can also be relied upon.

The preferred emulsifying medium is water. However, other emulsifying media can be employed, such as the dihydric alcohols, for example, ethylene glycol, diethylene glycol, propylene glycol, dipropylene glycol, and other akylene glycols. Also suitable as emulsifying media are trihydric alcohols, such as glycerol, and the like. Also useful are aqueous emulsifying media comprised of mixtures of water with the foregoing compounds. Various proportions of emulsifying media can be employed, depending somewhat upon subsequent process operations. However, the ratio is generally in the range up to 5 parts of emulsifying media, such as water, per part of reaction mixture, such as polymer and unreacted polyhalogenated cyclopentadiene. The ratio is preferably in the range of 0.5 to 2 parts of emulsifying medium per part by weight of reaction mixture.

Various emulsifying agents can be employed, including the non-ionic, anionic and cationic types, as well as mixtures thereof, such as mixtures of non-ionic and anionic types. Suitable non-ionic emulsifying agents include the alkylphenoxypoly(ethyleneoxy)ethanols, and the dialkylphenoxypoly(ethyleneoxy) ethanols, preferably those wherein the alkyl substituent has 5 to 12 carbon atoms and which have 1 to 20 ethylenoxy groups. Typical members are octylphenoxypoly(ethyleneoxy)ethanol, nonylphenoxypoly(ethyleneoxy)ethanol and dodecylphenoxypoly(ethyleneoxy)ethanol. Also useful are the fatty acid esters of polyhydric alcohols or ether alcohols, for example, glycerol mono-stearate; esters of ethylene glycol, diethylene glycol, triethylene glycol and polyethylene glycol, for example, the condensation product of oleic acid with ethylene oxide; and fatty esters of sugar alcohols. Suitable anionic emulsifying agents include the alkali metal alkylbenzene sulfonates, particularly those wherein the alkali metal is sodium or potassium and the alkyl group has 8 to 20 carbon atoms. Typical members are sodium dodecylbenzene sulfonate and potassium dodecylbenzene sulfonate. Another suitable group of anionic emulsifying agents is the alkali metal alkyl sulfates, particularly those wherein the alkali metal is sodium or potassium and the alkyl group has 8 to 20 carbon atoms. A typical member is sodium lauryl sulfate. Also useful are the sulfonated aliphatic polyesters, free acids of complex phosphate esters, sodium salts of complex phosphate esters and sodium salt of disproportionated wood rosin. Another suitable group of anionic emulsifying agents is the alkali metal lignin sulfonates, such as sodium lignin sulfonate and potassium lignin sulfonate. Suitable cationic emulsifying agents include the fatty amides of monoethanolamines; fatty nitriles and fatty acid amides, such as olein morpholide. Also useful are cationic agents such as N-coco-B-amino buteric acid, dicoco dimethyl ammonium chloride and polyoxyethylated alkylamines. Particularly suited for use in the process of the invention are mixtures of an anionic agent and a nonionic agent, such as a mixture of a sodium alkylbenzene sulfonate and an alkylphenoxypoly(ethyleneoxy)ethanol. The emulsifying agents are employed in a ratio of about 1 to 5 parts by weight per 100 parts of the butadiene polymer-polyhalogenated cyclopentadiene reaction product. Preferably, the ratio is in the range of 2 to 4 parts per 100 parts by weight.

Emulsification of the reaction product is generally conducted at a temperature up to about 150 degree centigrade, preferably in the range of 25 to 140 degree centigrade. Residence time in the emulsification zone can vary considerably depending on the type of equipment employed, but would generally be in the range of 0.1 to 10 minutes. Emulsification can be carried out in various mechanical devices which subject the components to vigorous agitation. A small vessel equipped with any efficient mixer, such as a paddle-type mixer is suitable, or other more elaborate devices, such as a high speed turbine, which give high shear agitation, can also be employed, in batch or continuous processes.

In one embodiment of the invention, the polymer emulsion is contacted with a solvent or diluent in which the polymer is substantially insoluble. Illustrative examples of such solvents are the alcohols, generally of 1 to 10 carbon atoms, preferably of 3 to 8 carbon atoms, and which generally have a boiling point of up to about 230 degree centigrade and which preferably boil in the range of 70 to 200 degrees centigrade. Typical acyclic alcohols include methanol, ethanol, allyl alcohol, propyl alcohol, isopropyl alcohol, butyl alcohol, amyl alcohol, hexyl alcohol, octyl alcohol, decyl alcohol, and the like. Suitable cycloaliphatic alcohols include cyclopentanol, cyclohexanol, and the like. Mixtures of the various alcohols can also be employed. Also, other solvents can be employed which do not adversely affect the isolation. In addition to the foregoing alcohols, the alcoholic medium can also comprise a minor proportion of another organic liquid or diluent. Suitable diluents for the alcohol include the aromatic hydrocarbons, for example of 6 to 8 carbon atoms, such as benzene, toluene, xylene, and the like; chlorinated hydrocarbons, for example of 2 to 8 carbon atoms, such as trichloroethylene, tetrachloroethane, the chlorobenzenes, the chlorotoluenes, and the like; esters, for example of 3 to 8 carbon atoms, such as isobutyl acetate, ethyl butyrate, and the like; and aliphatic ketones, for example of 3 to 8 carbon atoms, such acetone, methyl ethyl ketone, diethyl ketone, methyl isobutyl ketone, dibutyl ketone, and the like. The alcoholic medium is comprised of a major amount of alcohol, preferably at least 75 weight percent alcohol, more preferably 25 to 95 percent alcohol, the remainder comprised of one or more of the foregoing diluents. The suitable alcohols do not appreciably swell or dissolve the polyhalogenated polymer.

The proportion of alcoholic medium employed depends somewhat on the contacting equipment and other variables used in the process. However, the alcoholic medium is generally employed in the ratio of about 5 to 100 parts by weight of alcoholic medium per part by weight of polyhalogenated polymer, preferably in the range of about 8 to 20 parts of alcoholic medium per part of polymer. Various contacting times and temperatures can be employed, but these will generally be in the range of 10 to 70 degrees centigrade, preferably 25 to 50 degrees centigrade, and 0.1 to 1 hour. The alcohol contacting step can be accomplished in batch-operated or continuously operated equipment of various types. Thus, the contacting process can be carried out in a single enclosed vessel in which the emulsion is introduced into a volume of alcohol and vigorously agitated. Thereafter, the polymer is permitted to settle to the bottom of the vessel and the supernatant liquid is decanted off to a suitable recovery process for the separation of the alcohol and the unreacted polyhalogenated cyclopentadiene. Subsequently, additional alcoholic medium can be introduced to the vessel to reslurry the solid polymer products to facilitate additional removal of residual polyhalogenated cyclopentadiene therefrom. The latter contacting step can be repeated as often as desired. Alternatively, the treatment can be carried out in a series of enclosed vessels wherein the effluent of one vessel is phase separated, such as in a centrifuge, to recover the bulk of alcohol and the solid polymer is transferred to the next treating vessel in the series. The subsequent contacting step with alcohol can also be carried out in an apparatus in which the solid polymer is held substantially stationary and the treating liquid is circulated through the bed of solid polymer. The subsequent contacting step can also be carried out in a countercurrent contacting process wherein the solid polymer is passed countercurrent to a moving stream of alcohol. Thus, it is apparent that there are many methods for accomplishing the process of contacting the polyhalogenated polymer for removal of the residual, unreacted polyhalogenated cyclopentadiene therefrom.

Following the precipitation process, and subsequent treatment steps; if any, the solid, purified polymer can be recovered from the alcoholic medium in bath-operated or continuously operated filters of centrifuges, and the like. Thereafter, the polymer is dried in a suitable batch-operated or continuously operated dryer, such as a rotary dryer, tray dryer, and the like. In the drying process, the solid polymer is generally contacted with the hot gas which is non-reactive with the polymer product, and which is at a temperature up to about 150 degrees centigrade. The liquid and vapor effluents from the final recovery steps in the process are passed to suitable recovery processes for the separation of the polyhalogenated cyclopentadiene from the alcohol treating agent to facilitate recycle of components to the reaction and purification zones, respectively.

In another embodiment of the invention the emulsified reaction product is contacted with hot gases to facilitate evaporation of the unreacted polyhalogenated cyclopentadiene, as well as the emulsifying medium, and to form solid polymer. The treatment with hot gases can be suitably accomplished in equipment, such as spray dryers, shot dryers, and the like. The temperature is generally in the range of about 150 to 300 degrees centigrade, although higher and lower temperatures can be employed, depending upon the contact time with the hot gases. The contact time can vary considerably, but generally is in the range of from about 0.1 to 10 minutes, preferably 0.1 to 1 minute. Gases that can be employed are those that are non-reactive with the components of the emulsion. The off-gas from the contacting step is passed through a condenser to condense the volatile matter from which the polyhalogenated cyclopentadiene can be recovered for reuse in the process.

The polymer product of the aforesaid treatment with hot gases can be further purified, if desired, by contacting the solid polymer with a solvent or diluent in which the polymer is substantially insoluble. Suitable solvents or diluents for this purpose are the alcoholic media described hereinbefore. Likewise, the treatment steps with the alcoholic media are the same as those described hereinbefore with respect to the subsequent contacting steps for the alcohol-precipitated polymer product. Following such alcohol treatment steps, the solid, purified polymer can be recovered from the alcoholic medium in batch-operated or continuously operated filters or centrifuges, and the like. Thereafter, the polymer is dried in a suitable batch-operated or continuously operated dryer of the type and under conditions disclosed hereinbefore with respect to the precipitated product.

The solid polymer product of the process of the invention preferably contains less than about one weight percent of the high boiling, unreacted polyhalogenated cyclopentadiene, more preferably less than about 0.5 weight percent. The following tabulation shows the affect of free or unreacted hexachlorocyclopentadiene on the melting range of the polyhalogenated polymer product.

| Free hexachlorocyclopentadiene, weight percent: | Melting range, degrees centigrade |
| --- | --- |
| 14.3 | 125–131 |
| 4.9 | 169–181 |
| 1.4 | 180–188 |
| 0.2 | 185–197 |

The foregoing data were obtained with a hexachlorocyclopentadienepolybutadiene product containing 58.9 weight percent chlorine and having [$n$] of 0.324 measured in toluene. The melting range was observed by placing polymer between cover glasses on a Fisher-Johns hot stage.

The invention is further described in the following specific examples which are intended to further illustrate the invention, but not to limit it. In these examples, the temperatures are given in degrees centigrade and parts are by weight unless specified otherwise.

EXAMPLE 1

Seventy-five parts of a polybutadiene rubber having a cis-1,4 content of about 95 percent and an intrinsic viscosity of 2.15 deciliters per gram, measured in toluene, and 900 parts of hexachlorocyclopentadiene that had been treated with magnesium oxide for removal of impurities, were introduced into a reactor together with 18 parts of epichlorohydrin. With the reactor under nitrogen atmosphere, the reactor contents were heated at about 100 degrees centigrade to dissolve the rubber. Thereafter, 0.1 part of meta-dinitrobenzene was added to the reactor, and the reaction was carried out for 5 hours with agitation at 150 degrees centigrade. The contents were discharged from the reactor with 860 parts of xylene. Then 100 parts of the resulting polymer solution were mixed with 75 parts of water and about 2.5 parts of octylphenoxypoly(ethyleneoxy)ethanol containing about 10 ethyleneoxy groups per molecule in a blender at 25 to 38 degrees centigrade. The resulting dispersion was poured into 405 parts of normal amyl alcohol, while maintaining good agitation of the mixture. The resulting white, powdered polymer was centrifuged from the dispersion, washed with normal amyl alcohol, and then with isopropyl alcohol, and then dried in a vacuum oven for about 8 hours at 140 degrees centirgrade and 3 mm. of mercury pressure. The polymer product had a chlorine content of 58.2 weight percent, and an intrinsic viscosity of 0.79 deciliters per gram, measured in toluene.

EXAMPLE 2

Seventy-five parts of polybutadene rubber having a cis-1,4 content of about 95 percent, and 900 parts of hexachlorocyclopentadiene were introduced into a reactor together with 18 parts of epichlorohydrin. With the reactor open to the atmosphere, the ractor contents were heated for 3 hours at 110 degrees centigrade to dissolve the rubber, and then for 1 hour at 150 degrees centigrade. Thereafter, 0.1 part of meta-dinitrobenzene was added to the reactor, which was then flushed with nitrogen gas. The reaction was continued for 4 hours with agitation at 150 degrees centigrade. Then 100 parts of the resulting polymer solution was mixed with 100 parts of water and about 5 parts of octylphenoxypoly(ethyleneoxy)ethanol containing about 10 ethyleneoxy groups per molecule in a blender at 25 to 38 degrees centigrade. The resulting dispersion was poured into 324 parts of normal amyl alcohol, while maintaining good agitation of the mixture. The resulting white powdered polymer was centrifuged from the dispersion, washed with normal amyl alcohol, and then with isopropyl alcohol, and then dried in a vacuum oven for about 8 hours at 140 degrees centigrade and 3 mm. of mercury pressure. The polymer product had a chlorine content of 59.5 weight percent, and an intrinsic viscosity of 0.459 deciliters per gram, measured in toluene.

EXAMPLE 3

Seventy-five parts of a polybutadiene rubber having a cis-1,4 content of 95 percent were reacted with 900 parts of hexachlorocyclopentadiene in the presence of 18 parts of epichlorohydrin. The reaction zone was placed under a nitrogen atmosphere and the reactor contents were heated at about 100 degrees centigrade to dissolve the rubber. Thereafter, 0.1 part of meta-dinitrobenzene was added to the reactor, and the reaction was carried out for five hours with agitation at 150 degrees centigrade. The reactor contents were discharged from the reactor with 760 parts by weight of xylene. Then 100 parts of the resulting polymer solution were mixed with 75 parts of water and 2.5 parts of octylphenoxypoly(ethyleneoxy)ethanol containing about 10 ethyleneoxy groups per molecule, in a blender at 25 to 38 degrees centigrade. The resulting emulsion was introduced at a rate of about 200 parts by weight per minute to the upper portion of a spray dryer in which it was contacted with a hot gas which entered the spray dryer at 260 degrees centigrade and exited at about 190 to 200 degrees centigrade. In the spray dryer, the unreacted hexachlorocyclopentadiene and water were vaporized and the vapors passed out of the dryer with the hot gases. A solid polymer product was recovered from the bottom portion of the dryer in particulate form. The spray dried product contained 4.9 weight percent unreacted hexachlorocyclopentadiene.

To 10 parts of the aforesaid spray dried polymer were mixed 78.1 parts by weight of isopropyl alcohol and 8.6 parts by weight of toluene. The mixture was agitated and heated for two hours at the reflux temperature. Thereafter, the liquid was filtered from the solid polymer, which was thereafter mixed with an additional 16 parts by weight of hot isopropyl alcohol. The polymer product was filtered and then dried in a vacuum oven for two hours at 100 degrees centigrade and 3 millimeters of mercury pressure. The resulting polymer product was analyzed in an ultraviolet spectrophotometer and found to contain only 0.6 weight percent of unreacted hexachlorocyclopentadiene. The polymer contained 60.4 weight percent chlorine and had an intrinsic viscosity of 0.283 when measured at 30 degrees in toluene.

While the invention has been described with reference to certain specific embodiments, it will be recognized by those skilled in the art that many variations are possible without departing from the spirit and scope of the invention.

We claim:

1. A process which consists essentially of (1) contacting an aqueous emulsion comprised of (a) the polymer adduct of a polybutadiene having at least 80 percent of cis-1,4 configuration and a polyhalogenated cyclopentadiene of the formula

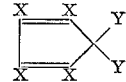

wherein X is selected from the group consisting of fluorine, chlorine and bromine and Y is selected from the group consisting of fluorine, chlorine, bromine and an alkoxy radical, (b) unreacted polyhalogenated cyclopentadiene, (c) an aqueous emulsifying medium, and (d) about 1–5 parts by weight per 100 parts of halogenated polymer of an emulsifying agent with an alcoholic medium in which the polymer is substantially insoluble, wherein the alcohol has 3 to 8 carbon atoms, to separate the emulsion into an aqueous phase and a polymer phase, and (2)

recovering the polymer product containing less than about one weight percent of unreacted hexachlorocyclopentadiene.

2. The process of claim 1 wherein the polyhalogenated cyclopentadiene is hexachlorocyclopentadiene.

3. The process of claim 2 wherein the alcoholic medium is an alcohol of 3 to 8 carbon atoms and is employed in the ratio of about 5 to 100 parts by weight of alcoholic medium per part by weight of polyhalogenated polymer.

4. The process of claim 3 wherein the alcohol is normal amyl alcohol.

5. The process of claim 2 wherein the polymer phase is contacted with additional alcoholic medium to further remove unreacted hexachlorocyclopentadiene therefrom.

6. A process which consists essentially of (1) forming an aqueous emulsion comprised of (a) the polymer adduct of a polybutadiene having at least 80 percent of cis-1,4 configuration and a polyhalogenated cyclopentadiene of the formula

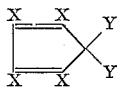

wherein X is selected from the group consisting of fluorine, chlorine and bromine and Y is selected from the group consisting of fluorine, chlorine, bromine and an alkoxy radical, (b) unreacted polyhalogenated cyclopentadiene, (c) an aqueous emulsifying medium, and (d) about 1–5 parts by weight per 100 parts of halogenated polymer of an emulsifying agent at a temperature up to about 150 degrees centigrade; (2) effecting the separation of the emulsion into an aqueous phase and a polymer phase by contacting said emulsion with an alcoholic medium in which the polymer is substantially insoluble, wherein the alcohol has 3 to 8 carbon atoms, or a hot gas that is non-reactive with the components of the emulsion, and (3) recovering the polymer product containing less than about one weight percent of unreacted hexachlorocyclopentadiene.

7. The process of claim 6 wherein 0.5 to 2 parts of emulsifying medium per part by weight of reaction mixture are employed in the emulsification step which is conducted at a temperature in the range of 25 to 140 degrees centigrade.

8. The process of claim 7 wherein said alcoholic medium is an alcohol of 3 to 8 carbon atoms employed in the ratio of about 5 to 100 parts by weight of alcoholic medium per part by weight of polyhalogenated polymer.

9. The process of claim 7 wherein said hot gas is at a temperature of 150 to 300 degrees centigrade and the contact time is in the range of about 0.1 to 10 minutes.

10. A process which consists essentially of (1) reacting a polybutadiene having at least 80 percent of cis-1,4 configuration with at least 5 parts by weight of hexachlorocyclopentadiene per part of polybutadiene, (2) forming an aqueous emulsion comprised of (a) the polymer adduct of said polybutadiene and hexachlorocyclopentadiene, (b) unreacted hexachlorocyclopentadiene, (c) water, and (d) about 1–5 parts by weight per 100 parts of halogenated polymer of an emulsifying agent; (3) effecting the separation of said emulsion into an aqueous phase and a polymer phase by contacting the emulsion with an alcohol of 3 to 8 carbon atoms in which the polymer is substantially insoluble, and (4) thereafter recovering a polymer product containing less than about one weight percent of unreacted hexachlorocyclopentadiene.

References Cited

UNITED STATES PATENTS

| 2,408,007 | 9/1946 | Thomas et al. | 260—93 |
| 2,917,495 | 12/1959 | Cobb et al. | 260—297 |
| 2,999,822 | 9/1961 | Pfan et al. | 260—2.5 |
| 3,320,220 | 5/1967 | Di Drusco | 260—80.78 |
| 3,325,464 | 6/1967 | Weil | 260—94.2 |
| 3,442,884 | 5/1969 | Hoch et al. | 260—94.7 |

FOREIGN PATENTS

| 1,120,137 | 12/1961 | Germany | 260—879 |

JOSEPH L. SCHOFOR, Pirmary Examiner

W. F. HAMROCK, Assistant Examiner

U.S. Cl. X.R.

260—85.1